United States Patent [19]

Tsuno et al.

[11] Patent Number: 5,055,359
[45] Date of Patent: Oct. 8, 1991

[54] MAGNETIC RECORDING MEDIUM WITH AN INTERMEDIATE PROTECTIVE LAYER OF SILICON DIOXIDE AND A PERFLUOROALKYLPOLYETHER LUBRICANT LAYER

[75] Inventors: Toshio Tsuno; Shinya Katayama, both of Tsukuba; Shinya Kawakita, Yotsukaichi; Tomoyasu Shimizu, Tsukuba, all of Japan

[73] Assignee: Nippon Sheet Glass Co., Ltd., Osaka, Japan

[21] Appl. No.: 657,614

[22] Filed: Feb. 20, 1991

Related U.S. Application Data

[63] Continuation of Ser. No. 450,893, Dec. 14, 1989, abandoned.

[51] Int. Cl.$^5$ .............................................. G11B 23/00
[52] U.S. Cl. .................................... 428/448; 428/694; 428/695; 428/900
[58] Field of Search ................ 428/694, 695, 500, 448

[56] References Cited

U.S. PATENT DOCUMENTS

| | | | |
|---|---|---|---|
| 4,721,795 | 1/1988 | Caporiccio et al. | 549/445 |
| 4,729,924 | 3/1988 | Skorjauec et al. | 428/422 |
| 4,757,145 | 7/1988 | Caporiccio et al. | 546/81 |
| 4,808,472 | 2/1989 | Caporiccio et al. | 428/336 |
| 4,889,939 | 12/1989 | Caporiccio et al. | 549/13 |

FOREIGN PATENT DOCUMENTS

63-285723  11/1988  Japan .

OTHER PUBLICATIONS

A. M. Scarati and G. Caporiccio: "Frictional Behaviour and Wear Resistance of Rigid Disks Lubricated with Neutal and Functional Perfluoropolyethers"; IEEE Transactions on Magnetics, vol. MAG-23, No. 1, Jan. 1987.

Y. Kimachi, F. Yoshimura, M. Hoshino and A. Terada: "Uniformity Quantification of Lubricant Layer on Magnetic Recording Media"; IEEE Transactions on Magnetics, vol. MAG-23, No. 5, Sep. 1987.

H. Hoshino, F. Yoshimura, Y. Kimachi, and Terada: "Lubrication Layer Using Aminosilane Coupling Reagent for Rigid Disk Media"; Summary of Science Lecture at Japanese Applied Magnetic Society of Eleventh, 1 p A-6 (1987.11) p. 14.

Dr. Gerardo Caporiccio: "A New Series of Lubricants for Magnetic Recording Media from Bifunctional Perfluoropolyether Derivatives"; Lecture at Symposium on Memory and Advanced Recording Technologies; S. Jose, Calif., 5-8 May 1986.

T. Miyamoto, Y. Andou and I. Sato: "Influence of Fluorocarbon Liquid Lubricant Upon Friction and Abrasion of Magnetic Disk"; Preliminary Draft at Thirtyssecondth National Constituency of Japanese Lubricant Society (Osaka) 481-484 page.

Primary Examiner—Merrell C. Cashion, Jr.
Assistant Examiner—Stevan A. Resan
Attorney, Agent, or Firm—Armstrong, Nikaido, Marmelstein, Kubovcik & Murray

[57] ABSTRACT

In a magnetic recording medium having a layer of a perfluoroalkylpolyether-based liquid lubricant as an uppermost layer, the liquid lubricant has an atomic group including an aromatic ring at a terminal end of a perfluoropolyether main chain, and is coated on an inorganic oxide. Therefore, adhesion force of the lubricant is greatly improved, and interaction within the lubricant can be decreased, thus realizing a magnetic recording medium having excellent lubricity and wear resistance.

1 Claim, 2 Drawing Sheets

MAGNETIC RECORDING MEDIUM WITH AN INTERMEDIATE PROTECTIVE LAYER OF SILICON DIOXIDE AND A PERFLUOROALKYLPOLYETHER LUBRICANT LAYER

This application is a continuation of application Ser. No. 450,893 filed Dec. 14, 1989, now abandoned.

BACKGROUND OF THE INVENTION

1. Field of the Invention

The present invention relates to a magnetic recording medium used for a magnetic recording apparatus such as a magnetic disk apparatus and, more particularly, to a magnetic recording medium having improved durability.

2. Description of the Prior Art

In a magnetic recording medium such as a hard magnetic disk for performing high-density recording, a metal magnetic thin film medium formed by, e.g., plating, sputtering, or evaporation, has been used in place of a conventional coating type medium using a coating type magnetic film containing a magnetic powder and a binder.

When a recording/reproducing operation is performed with respect to a hard magnetic disk, in general, a CSS (contact start stop) system is used. In the CSS system, the disk is rotated at a predetermined speed, so that a very small air layer is formed between a magnetic head and the magnetic disk, and a recording/reproducing operation is performed in this state.

In the CSS system, the head is physically in contact with a surface of the magnetic disk in a stop mode. At the start and end of rotation, the head and the magnetic disk move relative to each other in a contact and friction state. The head and the magnetic disk surface are worn by the friction at this time. When the head is brought into contact with the magnetic disk surface at high speed during a recording/reproducing operation, and large friction occurs between the head and the magnetic disk surface due to the presence of very small dust, the head or the magnetic film is often damaged. In particular, in the metal magnetic thin film medium, since the friction coefficient of the metal magnetic film is high, and the thickness of the film is small, the above problem is conspicuous.

Therefore, in order to achieve corrosion resistance and lubricity of an upper portion of the metal magnetic film, a magnetic recording medium, in which an inorganic oxide protective film such as an $SiO_2$ film is formed on a magnetic film directly or through a first protective film, and a liquid lubricant (e.g., fluorine oil; perfluoroalkylpolyether) is coated on an upper portion of the inorganic oxide protective film, has been conventionally used (e.g., Japanese Patent Laid-Open No. 61-160834).

An attempt has also been made to increase the coupling force between a lubricant and the inorganic oxide protective film by using a liquid lubricant having a polar group or functional group (e.g., Japanese Patent Laid-Open Nos. 61-208618 and 61-220120).

In the conventional magnetic recording medium on which a liquid lubricant is coated, however, the protective film is insufficiently coupled to the lubricant. Therefore, when CSS is repeated, the effect of the lubricant is gradually reduced, and the friction force is increased. As a result, sufficient wear resistance and damage resistance cannot be obtained. In addition, when the lubricant having the polar group or functional group is coated, the protective film is strongly coupled to the lubricant. However, the coupling force between the lubricant molecules is also increased. Therefore, an adhesion force between the head and the magnetic disk is increased, and the static friction force often exceeds the drive force for the motor of the magnetic disk medium.

SUMMARY OF THE INVENTION

The present invention has been made to solve the above problems, and has as its object to provide a magnetic recording medium, having excellent lubricity and wear resistance, in which perfluoroalkylpolyether which has an atomic group including an aromatic ring at a terminal end of a main chain is coated as a lubricant on an oxide film such as a metal oxide protective film formed on a metal magnetic substance, so that the adhesion force of the lubricant is greatly improved and interaction within the lubricant can be decreased.

In order to solve the above conventional problems, according to the present invention, there is provided a magnetic recording medium having a layer of a perfluoroalkylpolyether-based liquid lubricant as an uppermost layer, in which the liquid lubricant has an atomic group including an aromatic ring at a terminal end of a main chain of perfluoropolyether, and is coated on an inorganic oxide.

The above and other objects, features, and advantages of the present invention will be readily understood by the following detailed description in conjunction with the accompanying drawings.

DETAILED DESCRIPTION OF THE PREFERRED EMBODIMENT

Figure 1:
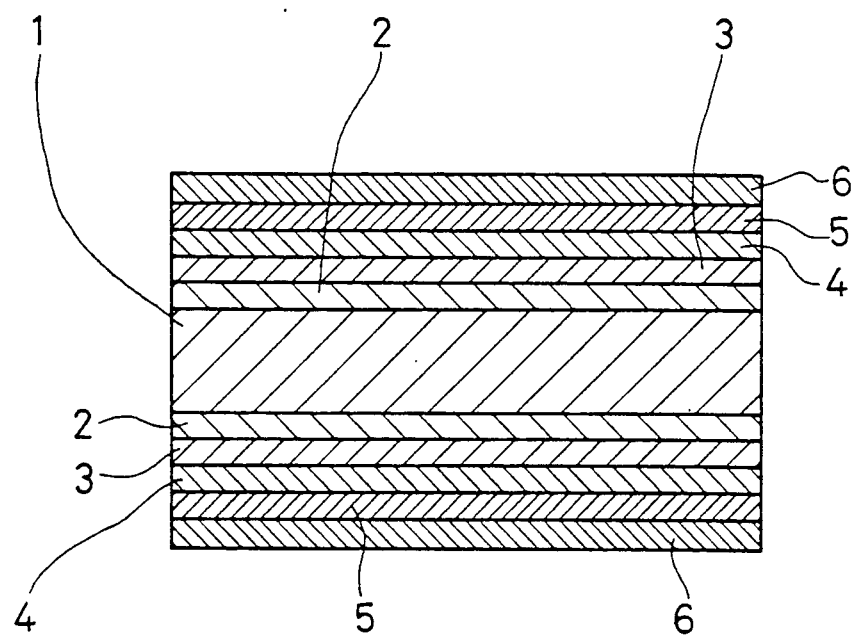
FIG. 1 is a sectional view of a magnetic recording medium according to the first embodiment.

A liquid lubricant is coated on an inorganic oxide in the present invention. As the inorganic oxide, e.g., an inorganic oxide protective film formed on a magnetic film or an inorganic substrate which holds a magnetic film can be exemplified.

As described above, in general, a protective film such as an inorganic oxide is formed on a magnetic film. The protective film of the inorganic oxide is formed by, e.g., sputtering, vacuum evaporation, a method, called a sol-gel method, of coating a metal alkoxide to form the protective film by hydrolysis, and a method of holding a metal protective film in a high-temperature atmosphere to cause natural oxidization of the film.

A large number of polar portions with positive or negative electric charges are present on a surface of the inorganic material thus obtained such as the inorganic oxide protective film or the inorganic substrate. These electric charges generate an electric field in an upper portion of the oxide layer.

When molecules of the lubricant having polar groups are set close to the surface of the oxide layer, the polar portions are attracted by the electric field, and a coupling force within the molecules of the lubricant is increased. This is a content of the conventionally employed technique. In this case, however, since a dipole-dipole interaction is present between the polar groups, the interaction between the molecules of the lubricant is strong. Therefore, a high lubricity cannot be realized.

In the present invention, therefore, perfluoroalkylpolyether which has an atomic group including an aromatic ring at a terminal end of a main chain is used as the lubricant. Since a polarizability of the electron cloud in the atomic group portion including the aromatic ring is high, a dipole is induced in the atomic group portion by the above-mentioned electric field on the surface of the oxide layer. As a result, the coupling force between the oxide layer and the molecules of the lubricant is increased. On the other hand, since the atomic group including the aromatic ring is electrically neutral in nature, only a weak van der Waals force acts between the molecules of the lubricant. Thus, a strong coupling force between the inorganic oxide layer and the liquid lubricant and high lubricity between the head and the disk can be realized at the same time.

A conductive metal magnetic layer is present under the oxide layer. In general, the electric field generated outside the inorganic oxide layer is weakened by a shielding effect due to the presence of the metal magnetic layer. When the thickness of the oxide layer is small, this shielding effect becomes strong, and a coupling mechanism by the above-mentioned electric field does not function, thus decreasing the coupling force of the lubricant. Therefore, the thickness of the oxide layer must be at least 3 nm.

When the oxide layer itself has conductivity, a similar problem is posed. In this case, the shielding distance (the length of Debye) by carriers in the conductive oxide layer must exceed about 10 nm.

In particular, silicon oxide realizes a high coupling force with respect to the lubricant as an inorganic oxide layer, and realizes excellent lubricity and durability. Silicon oxide can be easily formed without damaging properties of the metal magnetic layer using, e.g., a method of naturally oxidizing a film formed by sputtering metal silicon in a high-temperature atmosphere, a sol-gel method, and a method of exposing a part of a glass which serves as a substrate of the disk to form a CSS region. For these reasons, silicon oxide is preferably used.

For example, when perfluoropolyether is reacted with a lower hydrocarbon having a benzene ring, perfluoroalkylpolyether which has an atomic group including an aromatic ring at a terminal end of a main chain of a perfluoropolyether chain can be obtained. The structure of perfluoroalkylpolyether can be confirmed using, e.g., a nuclear magnetic resonance spectrum.

Among commercially available lubricants, "Fomblin AM2001" (trade name), available from MONTEDISON, Italy, can be exemplified. When this lubricant is used in the present invention, a good running property of the head and a strong coupling force to the metal oxide protective film can be achieved, and excellent lubricity and durability can be realized.

After the inorganic oxide protective film is formed, the lubricant is coated on the film to have a thickness of 10 nm or less by, e.g., dipping or spin-coating. Thereafter, a thermal treatment is performed at a temperature within the range of 60° C. to 250° C. to allow rearrangement of the molecules of the lubricant to stable energy positions on the inorganic oxide layer, thus remarkably enhancing the effect of an increase in adhesion force.

According to the present invention, perfluoroalkylpolyether which has an atomic group including an aromatic ring at a terminal end of a main chain is coated as a lubricant on an inorganic material such as an inorganic oxide protective layer or an inorganic substrate which is formed on a metal magnetic thin film directly or through a first protective film. Therefore, an electric field generated by electric charges of the inorganic oxide allows polarization of the atomic group including the aromatic ring, and a coupling force between the magnetic disk and the lubricant is increased. In addition, since this lubricant does not contain a polar or reactive group, the friction force is small, thus obtaining a good running property of the head.

EMBODIMENT

EXAMPLE 1

FIG. 1 is a sectional view showing a structure of a magnetic recording medium according to the present invention. Referring to FIG. 1, in the magnetic recording medium of this invention, a chromium (Cr) film serving as an undercoating layer 2 was formed on a chemically reinforced glass disk 1, and a cobalt-nickel-chromium (Co-Ni-Cr) alloy was formed on the undercoating layer 2 as a metal magnetic layer 3 to have a thickness of about 50 nm. In addition, a Cr film having a thickness of about 15 nm was formed on the metal magnetic layer 3 as a first protective film 4. In this case, the undercoating layer 2, the metal magnetic layer 3, and the first protective film 4 were formed on the glass substrate 1 by sputtering. A second protective film 5 of silicon oxide was formed on this disk by a sol-gel method.

In the sol-gel method, ethanol and water (containing 3 wt % of HCl) were added to silicon tetraethoxide in amounts five and six times (molar ratio) that of silicon tetraethoxide, respectively, and the resultant solution was stirred for about one hour. Ethanol in an amount ten times that of the solution was added to the solution to dilute the solution, thus obtaining a coating solution. After the disk in which the layers under the first protective film 4 were formed was dipped into this solution, the disk was pulled up slowly to form a coated film. Thereafter, a thermal treatment was performed at 200° C. for one hour. The second protective film 5 thus formed, consisting of silicon oxide, had a thickness of about 25 nm.

Perfluoroalkylpolyether (e.g., "Fomblin AM2001": trade name) which has an atomic group including an aromatic ring at a terminal end of a main chain of a perfluoropolyether chain was diluted by a solvent, i.e., trichlorotrifluoroethane, to have a concentration of 0.1%. The resultant dilute solution was coated on the disk by dipping to form a lubricant layer 6. The disk was left to stand at 110° C. for five minutes.

Note that the thermal treatment performed after the lubricant was coated is performed in order to stably arrange the silicon oxide protective film and the lubricant, thus improving a coupling force.

Figure 3:
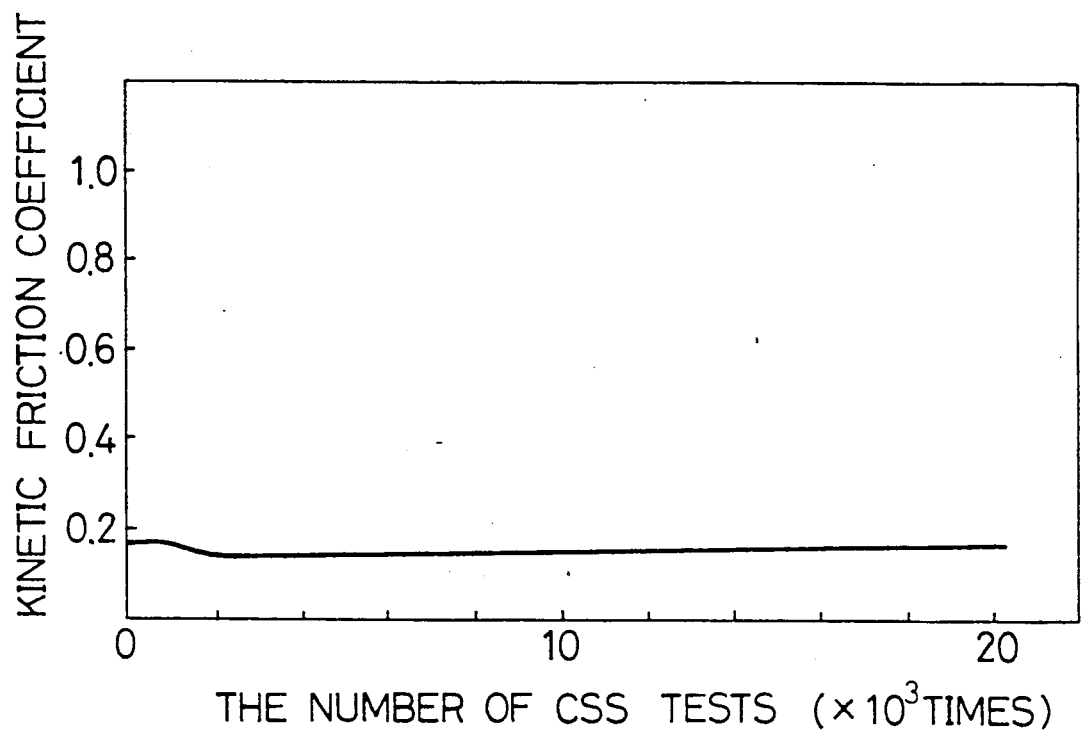
FIG. 3 is a graph showing a result of a CSS test for the magnetic recording medium according to the first embodiment of the present invention.

A test (to be referred to as a CSS test hereinafter) in which the disk in the present invention is rotated at high speed, i.e., 3,600 rpm, and contact start and stop of the head are repeated was performed. As shown in FIG. 3, the friction was not increased after the test was repeated 20,000 times, and no abnormality appeared on the disk surface.

EXAMPLE 2

An $SiO_2$ film 5 having a thickness of about 25 nm was formed on a disk, in which layers up to a first protective (Cr) film 4 were formed in the same manner as in Example 1, by RF sputtering using a quartz glass as a target. The same lubricant as in Example 1 was coated on the $SiO_2$ film 5 following the same procedures as in Example 1. Thereafter, the disk was left to stand at 110° C. for five minutes.

When a CSS test was performed in the same manner as in Example 1, the friction of the disk in the present invention was not increased after the CSS test was repeated 20,000 times, and no abnormality appeared on the disk surface.

COMPARATIVE EXAMPLE 1

Perfluoroalkylpolyether having —NCO as a polar group at a terminal end group was diluted by trichlorotrifluoroethane to have a concentration of 0.1%. The resultant dilute solution was coated by dipping on the disk in which layers up to a second protective film 5 were formed in the same manner as in Example 1.

The kinetic friction coefficient of the disk in Example 1 of the present invention was 0.2 or less. In contrast to this, the kinetic friction coefficient of the disk subjected to this treatment exceeded 0.4. When the CSS test was performed several hundred times, the kinetic friction coefficient exceeded 0.8. This is because interaction between the lubricant having a polar group and the head was strong, and the lubricant was also adhered to the head while CSS was repeated, thus causing a strong interaction between the molecules of the lubricant.

COMPARATIVE EXAMPLE 2

Perfluoroalkylpolyether having no aromatic ring or a polar group at a terminal end was diluted by trichlorotrifluoroethane to have a concentration of 0.1%. The resultant dilute solution was coated by dipping on the disk in which layers up to a second protective film 5 were formed in the same manner as in Example 1. Thereafter, the disk was left to stand at 110° C. for five minutes.

The kinetic friction coefficient of the disk in Example 1 of the present invention was 0.2 or less. In the disk subjected to this treatment, although the initial kinetic friction coefficient was 0.2 or less, the kinetic friction coefficient started to increase after the CSS test was repeated several hundred times, and a wear trace appeared on the disk after the test was repeated several thousand times. This is because the adhesion force between the lubricant and the disk was weak, and hence the lubricant was lost while the CSS was repeated.

COMPARATIVE EXAMPLE 3

The same lubricant as in Example 1 was directly coated on a disk, in which layers up to a first protective (Cr) film 4 were formed in the same manner as in Example 1, following the same procedures as in Example 1. Thereafter, the disk was left to stand at 110° C. for five minutes.

When the CSS test was performed in the same manner as in Example 1, in the disk in this comparative example, a wear trace appeared on the disk surface after the CSS test was repeated several ten times. This is because a coupling force between the first protective film of a metal and the lubricant used in this invention was weak.

EXAMPLE 3

Si was continuously sputtered on a disk in which layers up to a metal magnetic (Co-Ni-Cr) film 3 were formed by sputtering in the same manner as in Example 1, thus forming a first protective film 4 having a thickness of about 40 nm. Then, this disk was thermally treated in an atmosphere at 250° C., and an oxide film 5 was formed on a surface of the Si film. Thereafter, the same lubricant as in Example 1 was coated on the oxide film 5 in the same manner as in Example 1. Thereafter, this disk was left to stand at 110° C. for five minutes.

When the CSS test was performed in the same manner as in Example 1, in the disk of the present invention, the friction force was not increased after the CSS test was repeated 20,000 times, and no abnormality appeared on the surface of the disk. When the thickness of the silicon oxide film 5 was measured by an ellipsometer, it was about 6 nm.

COMPARATIVE EXAMPLE 4

The same lubricant as in Example 1 was coated on a disk, in which layers up to a first protective film 4 of Si were formed in the same manner as in Example 3, without performing a thermal treatment, in the same manner as in Example 1. Thereafter, the disk was left to stand at 110° C. for five minutes.

Thereafter, when the CSS test was performed, a wear trace appeared on the disk surface after the CSS test was repeated several hundred times. When the thickness of the silicon oxide film was measured by an ellipsometer, it was about 2 nm.

EXAMPLE 4

Ti was continuously sputtered on a disk in which layers up to a metal magnetic (Co-Ni-Cr) film 3 were formed by sputtering in he same manner as in Example 1, thus forming a first protective film 4 having a thickness of about 40 nm. Then, this disk was thermally treated in an atmosphere at 250° C. to form an oxide film 5 on the surface of the Ti film. Thereafter, the same lubricant as in Example 1 was coated on the oxide film 5 in the same manner as in Example 1. Thereafter, the disk was left to stand at 110° C. for five minutes.

When the CSS test was performed in the same manner as in Example 1, the friction was not increased in the disk according to the present invention after the CSS test was repeated 20,000 times, and no abnormality appeared on the disk surface.

EXAMPLE 5

Figure 2:
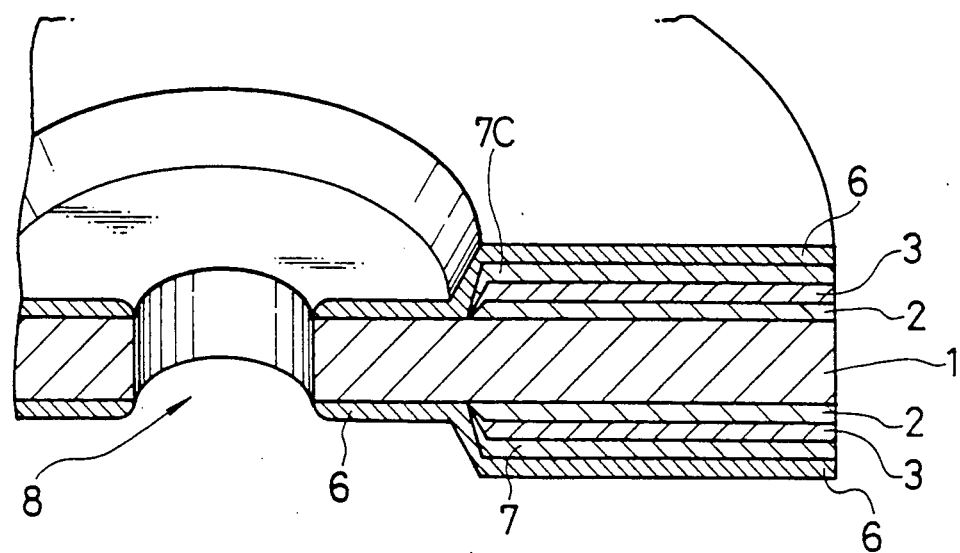
FIG. 2 is a sectional view of a magnetic recording medium according to the fifth embodiment.

FIG. 2 is a sectional view showing a structure of a magnetic recording medium according to this embodiment. Referring to FIG. 2, in the magnetic recording medium of this invention, a chromium (Cr) film 2 serving as an undercoating layer 2 was formed on a chemically reinforced glass disk 1, and a cobalt-nickel-chromium (Co-Ni-Cr) alloy was formed on the undercoating layer 2 as a metal magnetic layer 3 to have a thickness of about 50 nm. In addition, a C film having a thickness of about 40 nm was formed on the metal magnetic layer 3 as a protective film 7. In this case, the undercoating layer 2, the metal magnetic layer 3, and the protective film 7 were formed on the glass substrate 1 by sputtering. When a predetermined region in a central portion of the disk was masked upon formation of the film, the structure wherein a glass of this portion was exposed was achieved. The region in which the glass was exposed corresponded to a region in which a recording/reproducing head is physically brought into contact with the disk in a nonoperation mode. The same lubricant as in Example 1 was coated on this disk in the same manner as in Example 1. Thereafter, the disk was left to stand at 110° C. for five minutes.

After a CSS test for this disk was repeated 20,000 times, the friction force was not increased. When the disk was observed, no abnormality on the surface was found.

Thus, in the present invention, perfluoroalkylpolyether which has an atomic group including a aromatic ring at a terminal end of a main chain is coated as a lubricant on an oxide such as a metal oxide protective film formed on a metal magnetic substance. Therefore, adhesion force of the lubricant is greatly improved, an interaction within the lubricant can be decreased, thus obtaining a magnetic recording medium having excellent lubricity and wear resistance.

What is claimed is:
1. A magnetic recording medium comprising:
 (a) a magnetic recording layer;
 (b) a protective layer of silicon dioxide provided on the magnetic recording layer directly or with another protective layer interposed therebetween; and
 (c) an uppermost layer of a perfluoroalkylpolyether-based liquid lubricant having an atomic group which contains an aromatic ring at a terminal end of a perfluoropolyether main chain, wherein said layer of lubricant is provided directly on the layer of silicon dioxide, and wherein adhesion between said layer of silicon dioxide and said layer of lubricant is strengthened by thermal treatment of the layer of lubricant coated on the layer of silicon dioxide at a temperature in the range of 60° C. to 250° C.

* * * * *